US011155188B2

(12) United States Patent
Mason et al.

(10) Patent No.: US 11,155,188 B2
(45) Date of Patent: Oct. 26, 2021

(54) CHILD RESTRAINT SYSTEM AND ADJUSTABLE HEADREST ASSEMBLY THEREOF

(71) Applicant: Wonderland Switzerland AG, Steinhausen (CH)

(72) Inventors: Kyle S Mason, West Lawn, PA (US); David A Lehman, Lancaster, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/727,881

(22) Filed: Dec. 26, 2019

(65) Prior Publication Data

US 2020/0223331 A1 Jul. 16, 2020

Related U.S. Application Data

(60) Provisional application No. 62/790,707, filed on Jan. 10, 2019.

(51) Int. Cl.
*B60N 2/28* (2006.01)

(52) U.S. Cl.
CPC ......... *B60N 2/2851* (2013.01); *B60N 2/2812* (2013.01)

(58) Field of Classification Search
CPC .............................. B60N 2/2851; B60N 2/2812
See application file for complete search history.

(56) References Cited

U.S. PATENT DOCUMENTS

| 4,186,962 | A | 2/1980 | Meeker |
| 4,688,850 | A | 8/1987 | Brownlie |
| 4,729,600 | A | 3/1988 | Single, II |
| 4,913,490 | A | 4/1990 | Takahashi |
| 5,052,750 | A | 10/1991 | Takahashi |
| 5,106,154 | A | 4/1992 | Kain |
| 5,181,761 | A | 1/1993 | Meeker |
| 5,957,531 | A | 9/1999 | Kane |
| 6,170,911 | B1 | 1/2001 | Kassai |
| 6,318,799 | B1 | 11/2001 | Greger |
| 6,347,832 | B2 | 2/2002 | Mori |
| 6,554,358 | B2 | 4/2003 | Kain |
| 6,834,915 | B2 | 12/2004 | Sedlack |
| 7,073,859 | B1 | 7/2006 | Wilson |
| 7,887,128 | B2 | 2/2011 | Zink |
| 7,901,003 | B2 | 3/2011 | Meeker |

(Continued)

FOREIGN PATENT DOCUMENTS

| AU | 2017272241 A1 | 6/2018 |
| CN | 205674904 U | 11/2016 |

(Continued)

*Primary Examiner* — Anthony D Barfield
(74) *Attorney, Agent, or Firm* — Winston Hsu

(57) ABSTRACT

The present invention discloses a child restraint system. The child restraint system includes a main body and an adjustable headrest assembly. The adjustable headrest assembly is installed on the main body. The adjustable headrest assembly includes at least one rail disposed on the main body. The head support portion is movably disposed on the at least one rail. A position of the head support portion can be adjusted by movement of the head support portion relative to the rail easily. Furthermore, the present invention further discloses a related adjustable headrest assembly.

18 Claims, 12 Drawing Sheets

(56) References Cited

U.S. PATENT DOCUMENTS

| | | | |
|---|---|---|---|
| 8,764,108 B2* | 7/2014 | Gaudreau, Jr. ...... | B60N 2/2851 |
| | | | 297/250.1 |
| 9,010,857 B2 | 4/2015 | Chen | |
| 9,073,459 B2 | 7/2015 | Chen | |
| 9,150,126 B1 | 10/2015 | Kitchens | |
| 9,162,593 B2* | 10/2015 | Spence ............... | B60N 2/2812 |
| 10,632,871 B2* | 4/2020 | Schmitz ............... | B60N 2/2851 |
| 2005/0110318 A1 | 5/2005 | Meeker | |
| 2009/0102257 A1 | 4/2009 | Collias | |
| 2010/0244519 A1 | 9/2010 | Dingler | |
| 2011/0169310 A1 | 7/2011 | Keegan | |
| 2011/0193382 A1 | 8/2011 | Gaudreau, Jr. | |
| 2013/0320725 A1 | 12/2013 | Conway | |
| 2014/0008955 A1 | 1/2014 | Spence | |
| 2014/0252827 A1 | 9/2014 | Taylor | |
| 2014/0265488 A1 | 9/2014 | Heisey | |
| 2015/0076878 A1 | 3/2015 | Santamaria | |
| 2015/0091348 A1 | 4/2015 | Juchniewicz | |
| 2019/0077282 A1 | 3/2019 | Reaves | |
| 2019/0232826 A1 | 8/2019 | Lehman | |
| 2020/0223332 A1 | 7/2020 | Ma | |

FOREIGN PATENT DOCUMENTS

| | | | |
|---|---|---|---|
| CN | 108657033 A | 10/2018 | |
| EP | 1 953 034 A2 | 8/2008 | |
| EP | 2 147 818 A1 | 1/2010 | |
| EP | 2 716 494 A1 | 4/2014 | |
| EP | 2 883 745 A1 | 6/2015 | |
| RO | 133040 A2 | 1/2019 | |
| WO | 2012/065479 A1 | 5/2012 | |

* cited by examiner

CHILD RESTRAINT SYSTEM AND ADJUSTABLE HEADREST ASSEMBLY THEREOF

CROSS REFERENCE TO RELATED APPLICATIONS

This application claims the benefit of U.S. Provisional Application No. 62/790,707, filed on Jan. 10, 2019, and the entire contents of this application are hereby incorporated by reference.

BACKGROUND OF THE INVENTION

1. Field of the Invention

The present invention relates to a child product, and more particularly, to a child restraint system and an adjustable headrest assembly.

2. Description of the Prior Art

A child restraint system (CRS) is an apparatus installed on a seat of a vehicle and provided with a restraint device, such as a harness device, for securing a child sitting therein when traveling. When an emergency brake or a collision of the vehicle occurs, the child restraint system can reduce impact forces acting on the child and restrain the child's body movement by the restraint device for preventing injury or death of the child for ensuring sitting safety of the child. In order to provide a protection for the child's head, a headrest of the child restraint system has to be adjusted to a proper position according to the child's body shape. Therefore, there is a need to provide an improved child restraint system with easy adjustment of a headrest.

SUMMARY OF THE INVENTION

It is an objective of the present invention to provide a child restraint system and an adjustable headrest assembly thereof for solving the aforementioned problems.

In order to achieve the aforementioned objective, the present invention discloses a child restraint system. The child restraint system includes a main body and an adjustable headrest assembly. The adjustable headrest assembly is installed on the main body. The adjustable headrest assembly includes at least one rail disposed on the main body. The head support portion is movably disposed on the at least one rail.

According to an embodiment of the present invention, the main body includes a seat back portion and a seat portion, and the at least one rail extends along the seat back portion.

According to an embodiment of the present invention, the head support portion is slidably connected to the at least one rail.

According to an embodiment of the present invention, the at least one rail is fixedly disposed on the main body.

According to an embodiment of the present invention, the at least one rail is movably disposed on the main body and movable between a lower position and an upper position relative to the main body.

According to an embodiment of the present invention, the head support portion abuts against an upper portion of the at least one rail to drive the at least one rail to move to the upper position relative to the main body.

According to an embodiment of the present invention, the adjustable headrest assembly further includes at least one recovering component for biasing the at least one rail to recover to the lower position relative to the main body.

According to an embodiment of the present invention, an upper portion of the at least one rail abuts against an upper portion of the main body when the at least one rail is located at the lower position, and the upper portion of the at least one rail departs away from the upper portion of the main body when the at least one rail is located at the upper position.

According to an embodiment of the present invention, the child restraint system further includes a harness at least partially disposed between the head support portion and the main body and abutted against by the head support portion, and a length of a part of the harness exposed out of the head support portion is adjustable by movement of the head support portion relative to the at least one rail.

According to an embodiment of the present invention, the adjustable headrest assembly further includes a locking assembly for restraining or allowing movement of the head support portion relative to the main body. The locking assembly includes a rack disposed on the main body and a locking component disposed on the head support portion for detachably engaging with the rack. The locking component engages with the rack for restraining the movement of the head support portion relative to the main body, and the locking component disengages from the rack for allowing the movement of the head support portion relative to the main body.

In order to achieve the aforementioned objective, the present invention further discloses an adjustable headrest assembly installed on a main body of a child restraint system. The adjustable headrest assembly includes at least one rail and a head support portion. The at least one rail is disposed on the main body of the child restraint system. The head support portion is movably disposed on the at least one rail.

According to an embodiment of the present invention, the at least one rail extends along a seat back portion of the main body of the child restraint system.

According to an embodiment of the present invention, the head support portion is slidably connected to the at least one rail.

According to an embodiment of the present invention, the at least one rail is fixedly disposed on the main body.

According to an embodiment of the present invention, the at least one rail is movably disposed on the main body of the child restraint system and movable between a lower position and an upper position relative to the main body of the child restraint system.

According to an embodiment of the present invention, the head support portion abuts against an upper portion of the at least one rail to drive the at least one rail to move to the upper position relative to the main body of the child restraint system.

According to an embodiment of the present invention, the adjustable headrest assembly further comprises at least one recovering component for biasing the at least one rail to recover to the lower position relative to the main body of the child restraint system.

According to an embodiment of the present invention, an upper portion of the at least one rail abuts against an upper portion of the main body of the child restraint system when the at least one rail is located at the lower position, and the upper portion of the at least one rail departs away from the upper portion of the main body of the child restraint system when the at least one rail is located at the upper position.

According to an embodiment of the present invention, the head support portion abuts against a harness of the child restraint system, and a length of a part of the harness exposed out of the head support portion is adjustable by movement of the head support portion relative to the at least one rail.

According to an embodiment of the present invention, the adjustable headrest assembly further includes a locking assembly for restraining or allowing movement of the head support portion relative to the main body. The locking assembly includes a rack disposed on the main body and a locking component disposed on the head support portion for detachably engaging with the rack. The locking component engages with the rack for restraining the movement of the head support portion relative to the main body, and the locking component disengages from the rack for allowing the movement of the head support portion relative to the main body.

In summary, the present invention utilizes the movement of the head support portion relative to the rail to achieve movement of the head support portion relative to the main body. Besides, since the rail can move relative to the main body between the lower position and the upper position, the head support portion of the present invention even can be moved to a position much higher than the upper portion of the main body, which is appropriate for various sized children.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
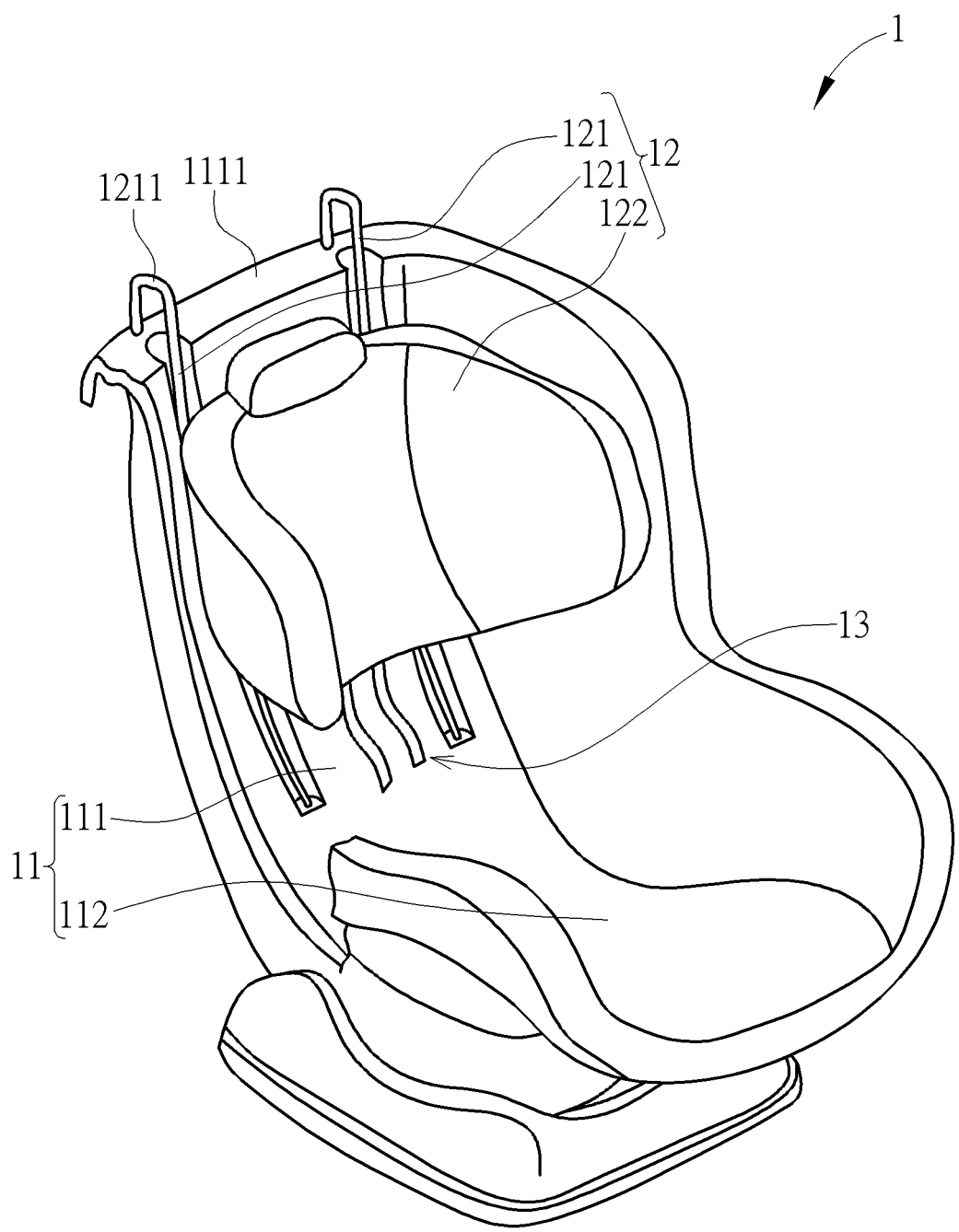
FIG. 1 is a partial diagram of a child restraint system according to a first embodiment of the present invention.
Figure 2:
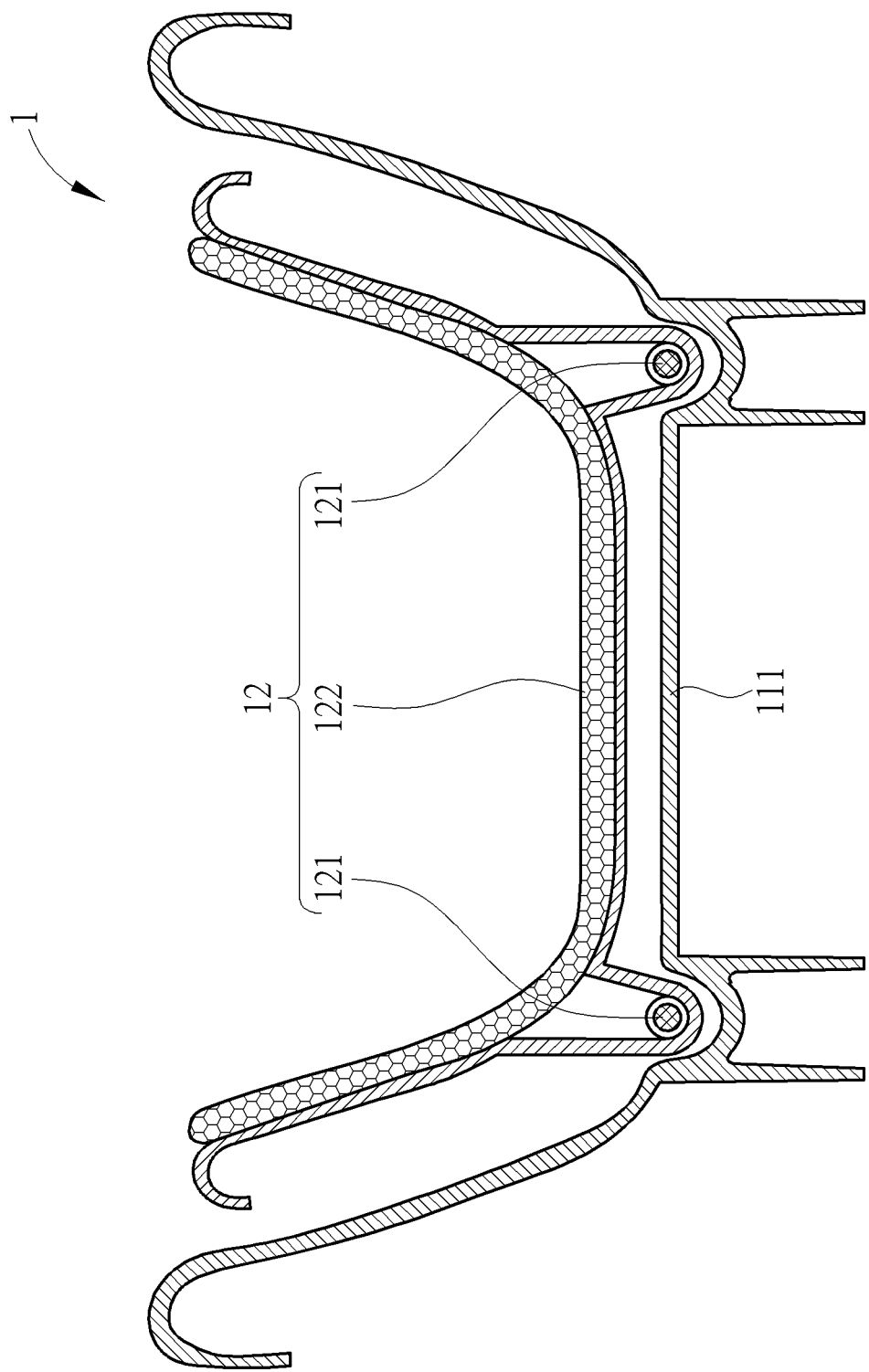
FIG. 2 is a partial sectional diagram of the child restraint system according to the first embodiment of the present invention.

Please refer to FIG. 1 and FIG. 2. FIG. 1 is a partial diagram of a child restraint system 1 according to a first embodiment of the present invention. FIG. 2 is a partial sectional diagram of the child restraint system 1 according to the first embodiment of the present invention. As shown in FIG. 1 and FIG. 2, the child restraint system 1 includes a main body 11, an adjustable headrest assembly 12 installed on the main body 11, and a harness 13 at least partially disposed between the adjustable headrest assembly 12 and the main body 11. The main body 11 is for accommodating a child. The adjustable headrest assembly 12 is for providing protection for the child's head. The harness 13 is for securing the child sitting in the main body 11.

Specifically, the adjustable headrest assembly 12 includes two rails 121 fixedly disposed on the main body 11, and a head support portion 122 movably disposed on the two rails 121. The harness 13 is at least partially disposed between the head support portion 122 and the main body 11. The main body 11 includes a seat back portion 111 and a seat portion 112, and each rail 121 extends along the seat back portion 111. The head support portion 122 is slidably connected to the two rails 121, so that the head support portion 122 can move relative to the main body 11 by sliding movement of the head support portion 122 relative to the two rails 121.

Preferably, in this embodiment, the head support portion 122 can be positioned relative to the two rails 121 by static friction therebetween, and the head support portion 122 can be forced to slide relative to the two rails 121 when the static friction is overcome. However, the present invention is not limited to this embodiment. For example, in another embodiment, the child restraint system can further include a locking assembly for restraining movement of the head support portion to prevent unintentional movement of the head support portion.

Furthermore, an upper portion 1211 of each rail 121 can be located at a position higher than an upper portion 1111 of the seat back portion 111 of the main body 11 for allowing the head support portion 122 to move to a position much higher than the upper portion 1111 of the seat back portion 111 of the main body 11. However, the present invention is not limited to this embodiment. For example, in another embodiment, the upper portion of the rail can be located at a position lower than the upper portion of the seat back portion. Alternatively, in another embodiment, the upper portions of the rail and the seat back portion can be located at the same height level.

Figure 3:
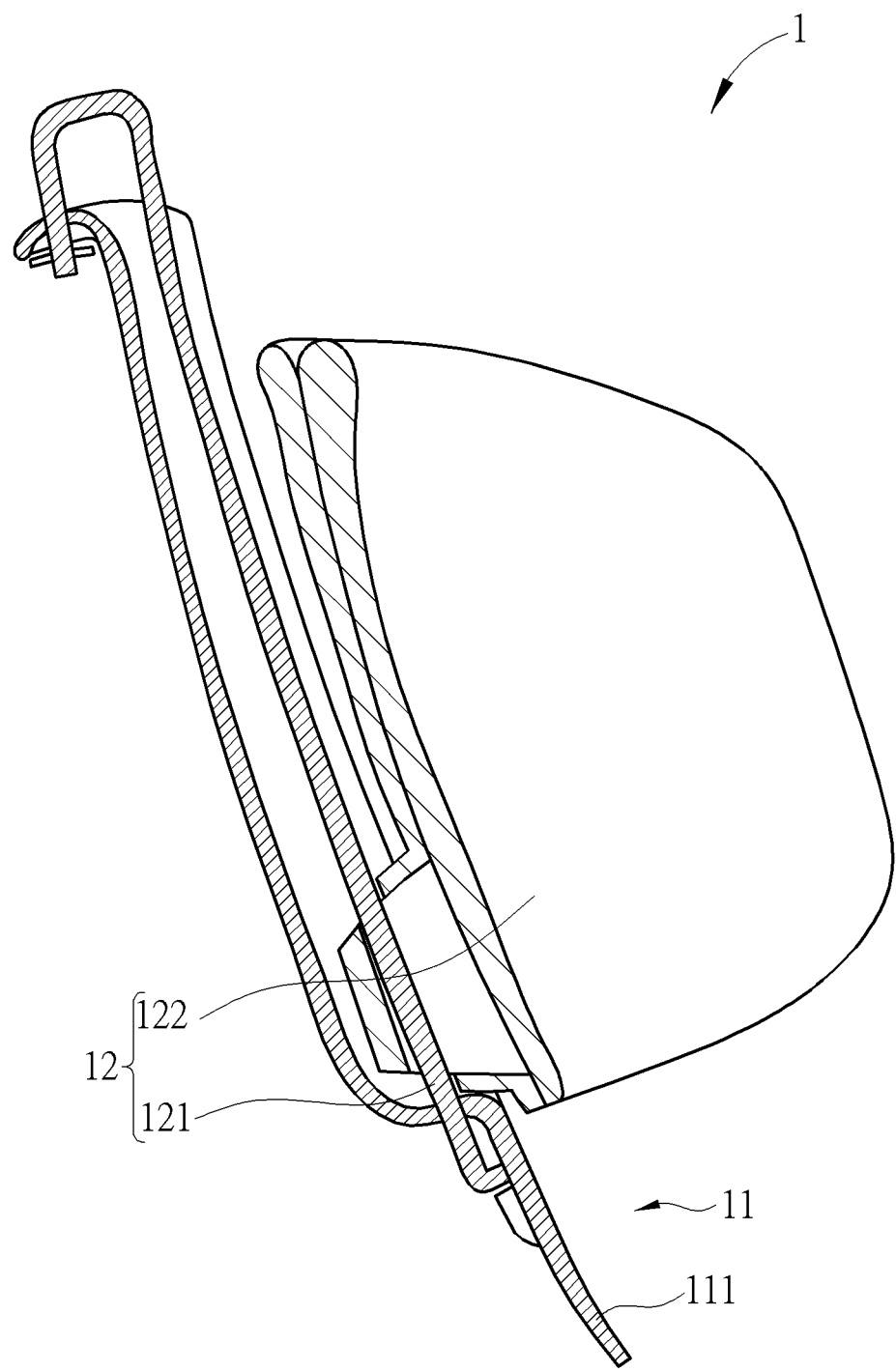
FIG. 3 and FIG. 4 are partial diagrams of the child restraint system in different using states according to the first embodiment of the present invention.
Figure 4:
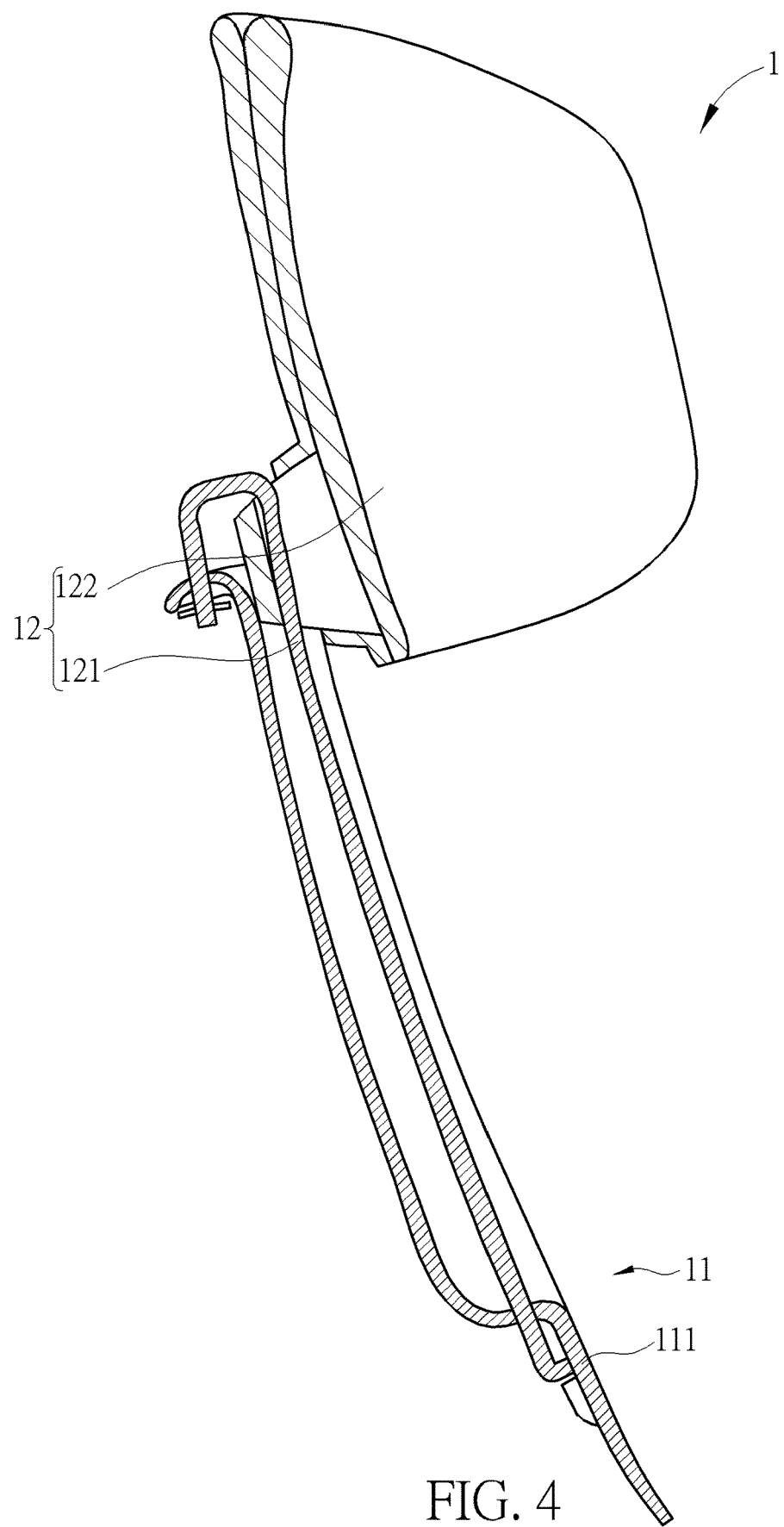

Please refer to FIG. 3 and FIG. 4. FIG. 3 and FIG. 4 are diagrams of the child restraint system 1 in different using states according to the first embodiment of the present invention. The head support portion 122 can be adjusted to any position between a position as shown in FIG. 3 and a position as shown in FIG. 4. When it is desired to adjust the head support portion 122 relative to the seat back portion 111 of the main body 11, the user can slide the head support portion 122 relative to the two rails 121, and the head support portion 122 can be positioned at a desired position between the position as shown in FIG. 3 and the position as shown in FIG. 4 by the static friction without additional operation, which achieves a purpose of adjustment of the head support portion 122 relative to the main body 11. During aforementioned movement of the head support portion 122, the harness 13 can be abutted against by a lower end of the head support portion 122, so that a length of a part of the harness 13 exposed out of the head support portion 122 is adjustable by movement of the head support portion 122 relative to the two rails 121 or the main body 11. In detail, the length of the part of the harness 13 exposed out of the head support portion 122 is shortened when the head support portion 122 moves downwardly from the position as shown in FIG. 3 to the position as shown in FIG. 4, and the length of the part of the harness 13 exposed out of the head support portion 122 is extended when the head support portion 122 moves upwardly from the position as shown in FIG. 4 to the position as shown in FIG. 3. Therefore, the present invention has an advantage of easy adjustment of the head support portion 122 and the harness 13 for various sized children.

Figure 5:
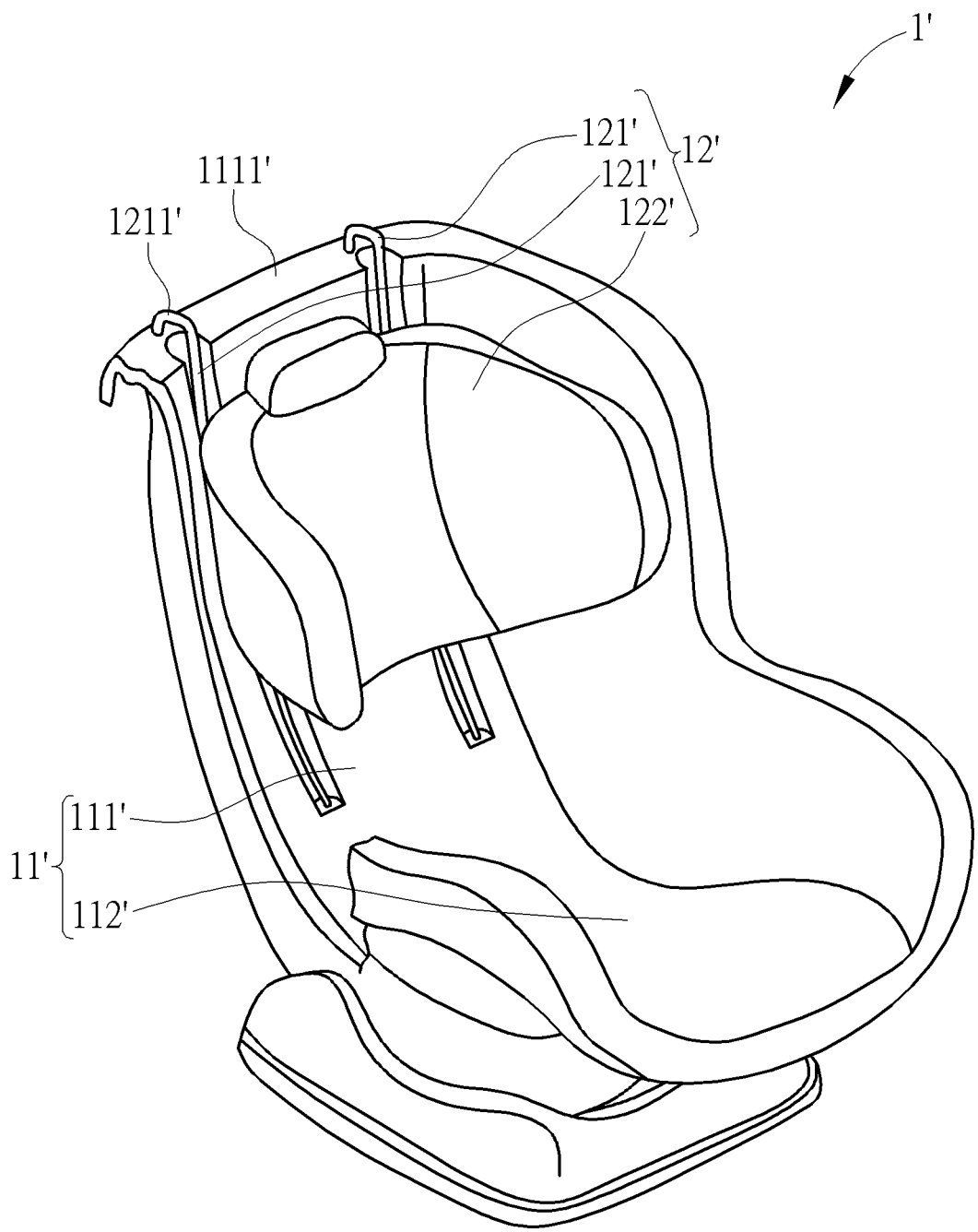
FIG. 5 is a partial diagram of a child restraint system according to a second embodiment of the present invention.
Figure 6:
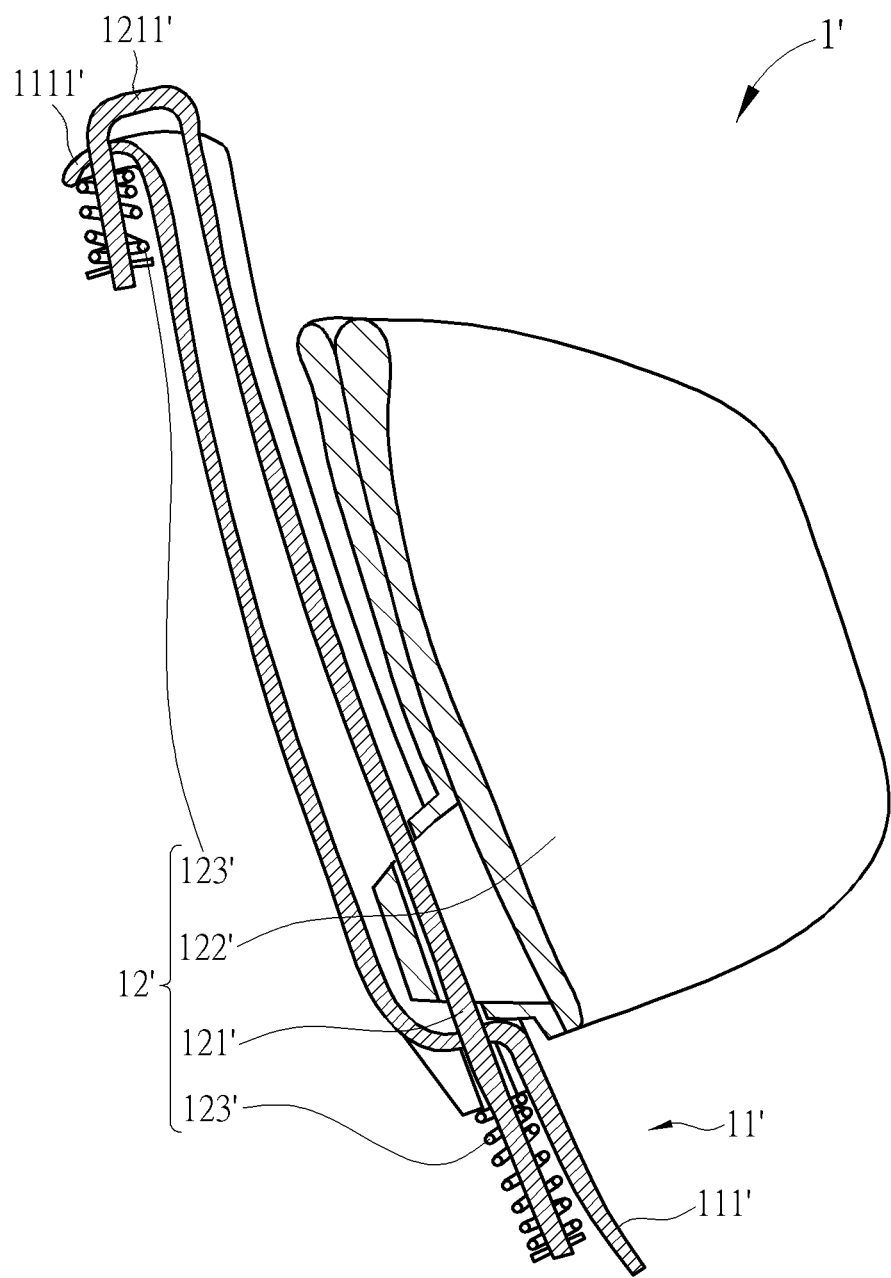
FIG. 6 and FIG. 7 are partial diagrams of the child restraint system in different using states according to the second embodiment of the present invention.
Figure 7:
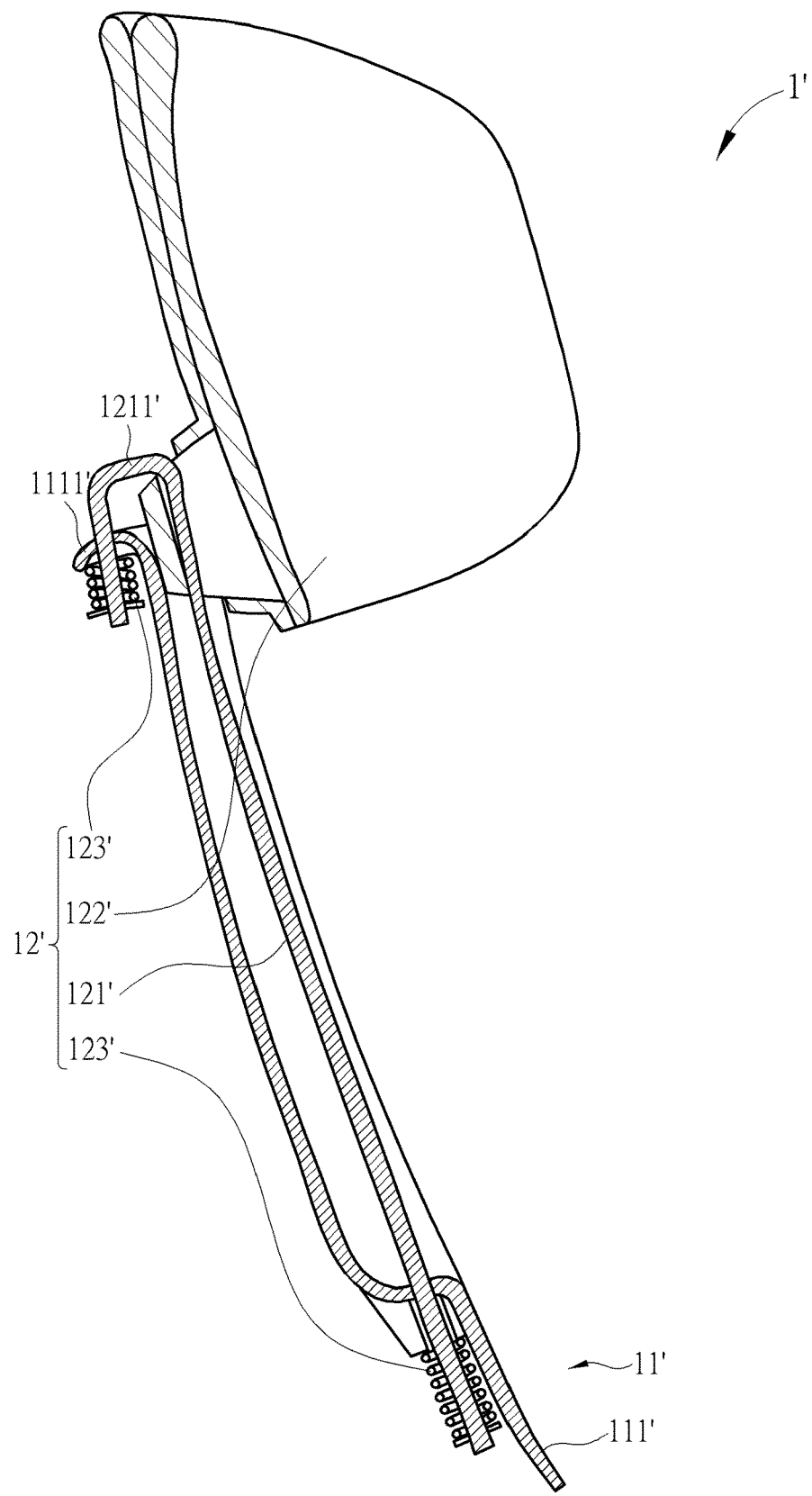

Please refer to FIG. 5 to FIG. 7. FIG. 5 is a partial diagram of a child restraint system 1' according to a second embodiment of the present invention. FIG. 6 and FIG. 7 are partial diagrams of the child restraint system 1' in different using states according to the second embodiment of the present invention. As shown in FIG. 5 to FIG. 7, different from the first embodiment, the child restraint system 1' of this embodiment includes two rails 121' movably disposed on a main body 11', a head support portion 122' slidably disposed on the two rails 121', and four recovering components 123'. Each rail 121' is movable relative to the main body 11' between a lower position as shown in FIG. 6 and an upper position as shown in FIG. 7. As shown in FIG. 6, an upper portion 1211' of each rail 121' abuts against an upper portion 1111' of a seat back portion 111' of the main body 11' when each rail 121' is located at the lower position. As shown in FIG. 7, the upper portion 1211' of each rail 121' departs away from the upper portion 1111' of the seat back portion 111' of the main body 11' when each rail 121' is located at the upper position. In other words, when each rail 121' is located at the upper position, the head support portion 122' is allowed to move to a position much higher than the upper portion 1111' of the seat back portion 111' of the main body 11'. Each rail 121' is connected to the two corresponding recovering components 123', so that each rail 121' is biased to recover to the lower position relative to the main body 11'.

Figure 8:
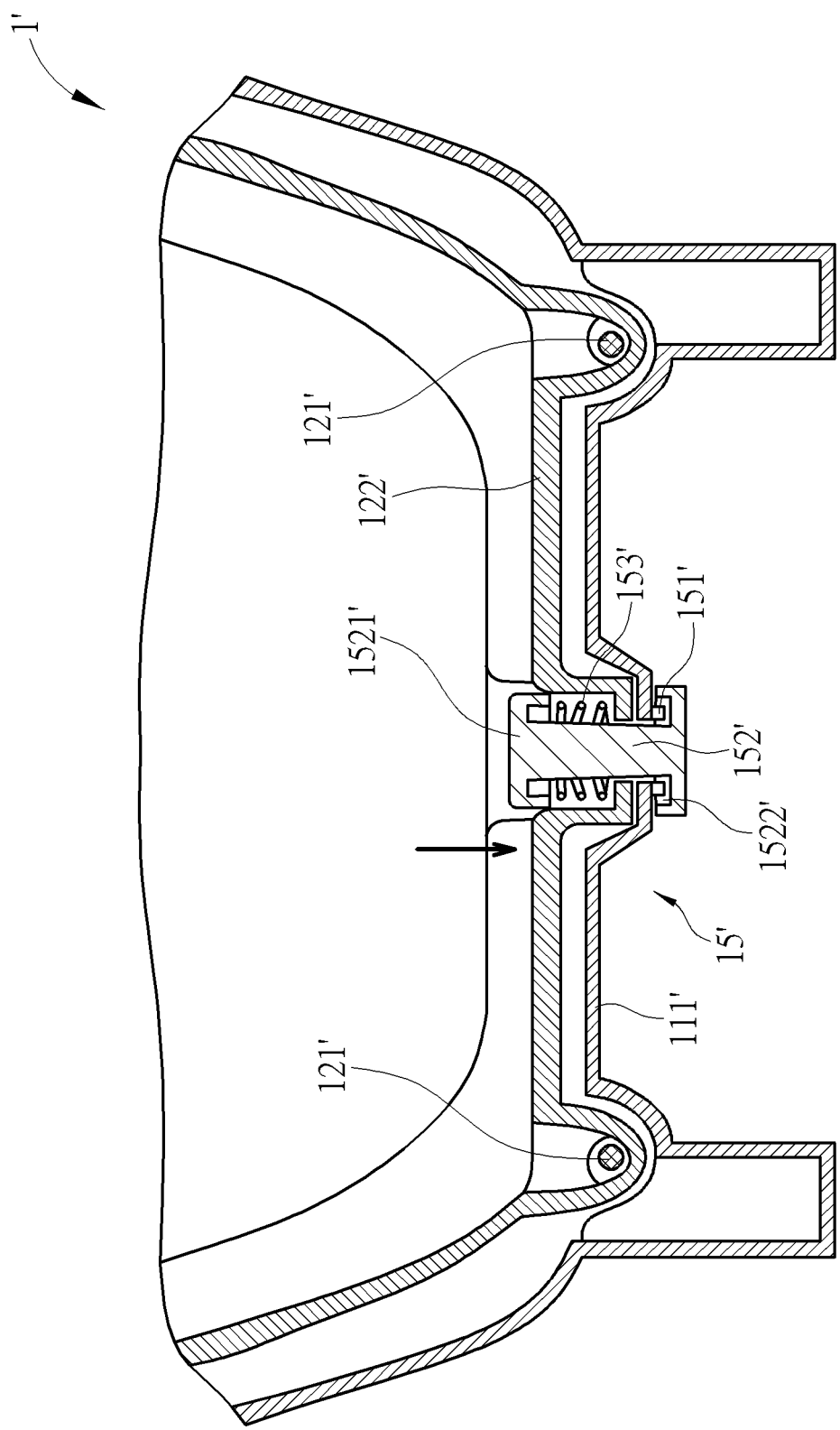
FIG. 8 is a partial sectional diagram of the child restraint system according to the second embodiment of the present invention.
Figure 9:
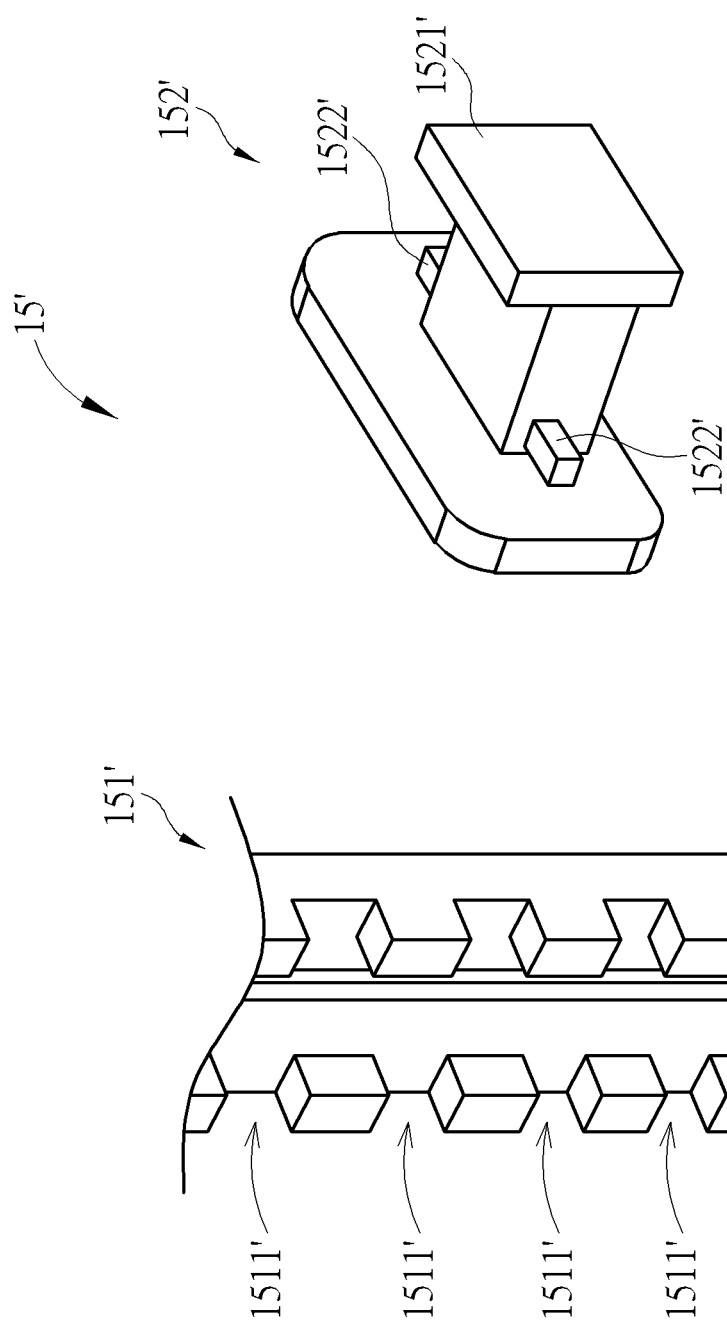
FIG. 9 is a partial diagram of a locking assembly according to the second embodiment of the present invention.
Figure 10:
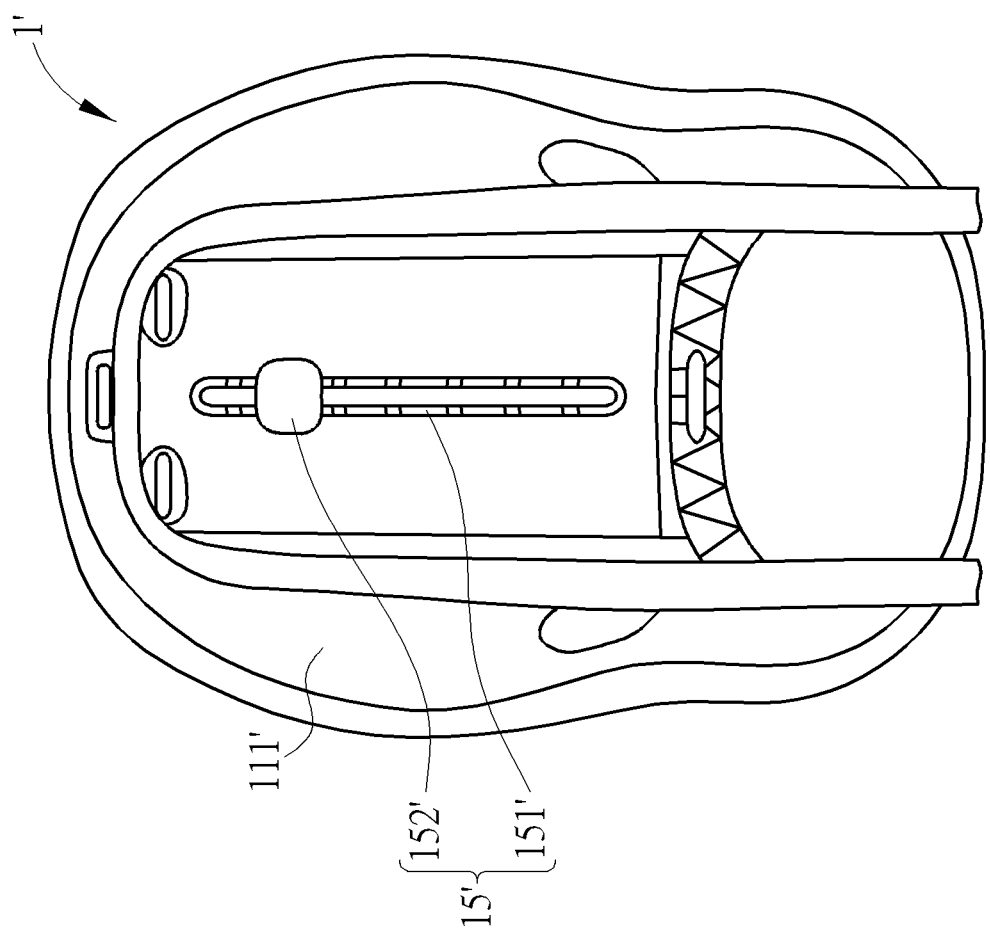
FIG. 10 is a rearview of the child restraint system according to the second embodiment of the present invention.

Please refer to FIG. 8 to FIG. 10. FIG. 8 is a partial sectional diagram of the child restraint system 1' according to the second embodiment of the present invention. FIG. 9 is a partial diagram of a locking assembly 15' according to the second embodiment of the present invention. FIG. 10 is a rear view of the child restraint system 1' according to the second embodiment of the present invention. As shown in FIG. 8 to FIG. 10, in this embodiment, since the two rails 121' are movable relative to the main body 11' and biased by the recovering components 123', the child restraint system 1' further includes the locking assembly 15' for restraining movement of the head support portion 122'. The locking assembly 15' includes a rack 151', a locking component 152' and a resilient component 153'. The rack 151' is disposed on the main body 11'. The locking component 152' is disposed on the head support portion 122' for detachably engaging with the rack 151'. The resilient component 153' abuts against the locking component 152' for biasing the locking component 152' to engage with the rack 151'. In this embodiment, the rack 151' is disposed on a rear side of the seat back portion 111' of the main body 11'. A plurality of engaging notches 1511' are formed on the rack 151'. The locking component 152' includes a button portion 1521' exposed out of a front side of the head support portion 122' for being pushed, and two engaging portions 1522' for engaging with the two corresponding engaging notches 1511' on the rack 151'. When the button portion 1521' is pushed to disengage the two engaging portions 1522' of the locking component 152' from the two corresponding engaging notches 1511' on the rack 151', the movement of the head support portion 122' relative to the main body 11' is allowed, and a position of the head support portion 122' can be adjusted by movement of the two rails 121' relative to the main body 11' and/or movement of the head support portion 122' relative to the two rails 121'. After adjustment of the head support portion 122', the button portion 1521' can be released to engage the two engaging portions 1522' of the locking component 152' with the two corresponding engaging notches 1511' on the rack 151' by the resilient component 153' to restrain the movement of the head support portion 122', so as to position the head support portion 122'.

Figure 11:
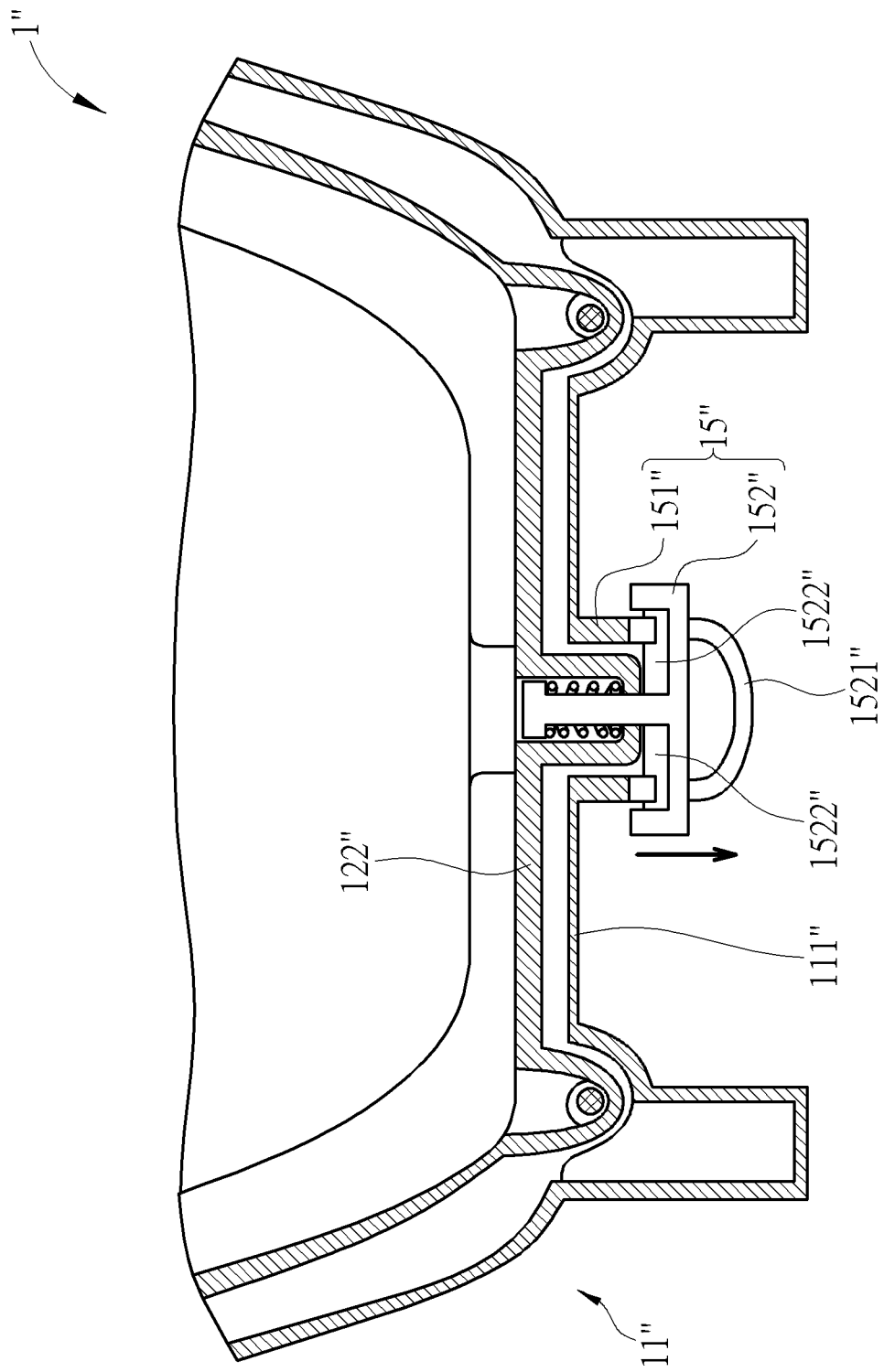
FIG. 11 is a sectional diagram of a child restraint system according to a third embodiment of the present invention.

However, the locking assembly of the present invention is not limited to this embodiment. For example, please refer to FIG. 11 and FIG. 12. FIG. 11 is a partial sectional diagram of a child restraint system 1" according to a third embodiment of the present invention. As shown in FIG. 11, a locking component 152" of a locking assembly 15" of the child restraint system 1" of this embodiment includes a handle portion 1521" exposed out of a rear side of a seat back portion 111" of a main body 11" of the child restraint system 1" for being pulled. In other words, two engaging portions 1522" of the locking component 152" can be driven to be disengaged from two corresponding engaging notches 1511" on a rack 151" of the locking assembly 15" for allowing adjustment of a head support portion 122" when the handle portion 1521" is pulled.

Figure 12:
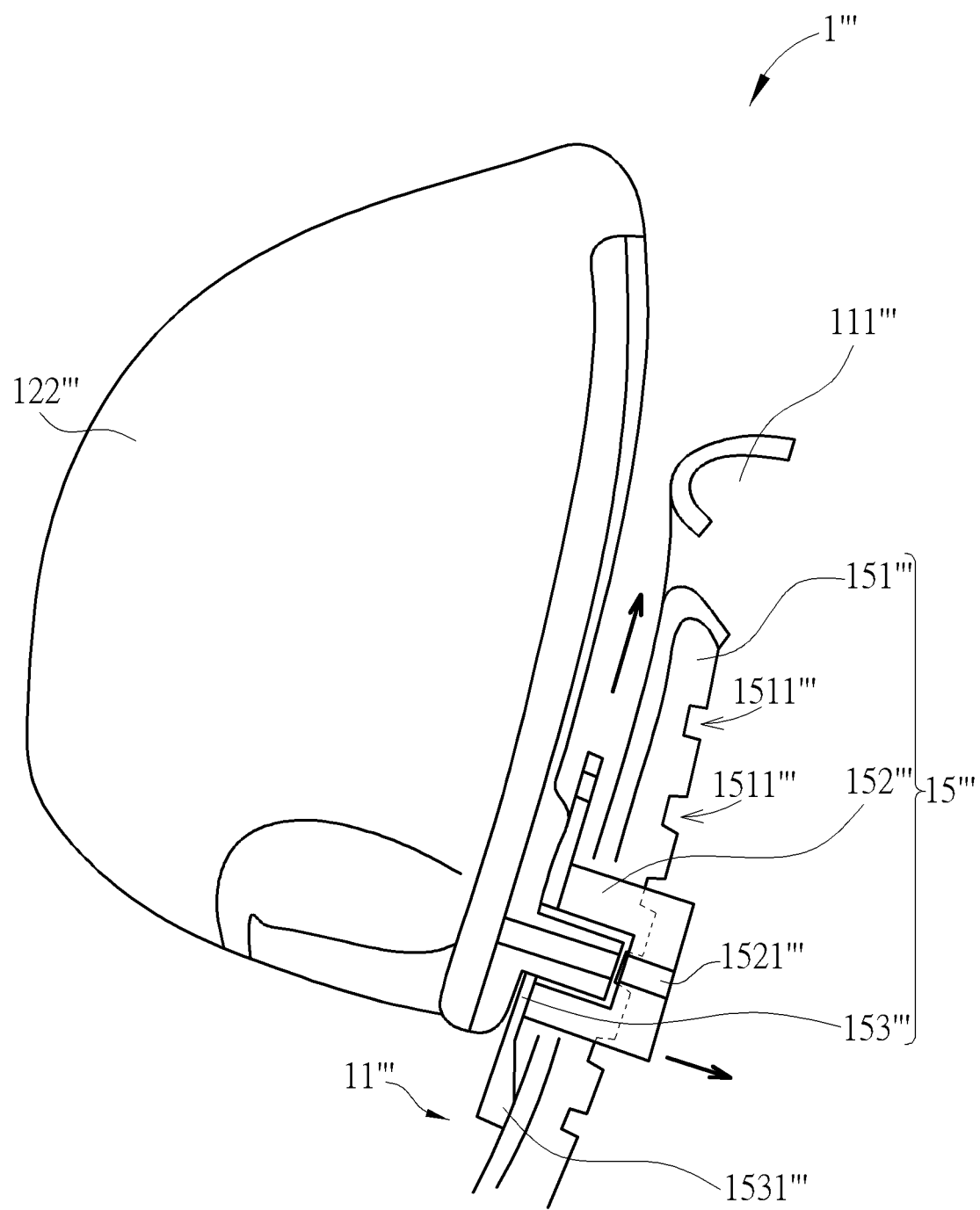
FIG. 12 is a sectional diagram of a child restraint system according to a fourth embodiment of the present invention.

Besides, FIG. 12 is a partial sectional diagram of a child restraint system 1' according to a fourth embodiment of the present invention. As shown in FIG. 12, a locking assembly 15' of this embodiment includes a rack 151', a locking component 152', a resilient component, which is not shown in the figure, and an operating component 153'. The rack 151' is disposed on a rear side of a seat back portion 111' of a main body 11' of the child restraint system 1'. The locking component 152' is installed on and movable relative to the rack 151' for engaging two engaging portions 1521' with two corresponding engaging notches 1511' on the rack 151' or disengaging the two engaging portions 1521' from the two corresponding engaging notches 1511' on the rack 151'. The operating component 153' is movably disposed between a head support portion 122' and the locking component 152' and includes an inclined structure 1531' for driving the locking component 152" to disengage from the rack 151" when the operating component 153' is operated upwardly. When the operating component 153' is operated upwardly, the inclined structure 1531' drives the locking component 152' to move rearwardly to disengage the two engaging portions 1521' of the locking component 152' from the two corresponding engaging notches 1511' on the rack 151' for allowing adjustment of the head support portion 122'. After adjustment of the head support portion 122', the operating component 153' can be released, so that the resiliently deformed resilient component drives the locking component 152' to move forwardly to engage the two engaging portions 1521' of the locking component 152' with the two corresponding engaging notches 1511' on the rack 151' for positioning the head support portion 122'.

In contrast to the prior art, the present invention utilizes the movement of the head support portion relative to the rail to achieve movement of the head support portion relative to the main body. Besides, since the rail can move relative to the main body between the lower position and the upper position, the head support portion of the present invention even can be moved to a position much higher than the upper portion of the main body, which is appropriate for various sized children.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child restraint system comprising:
a main body; and
an adjustable headrest assembly installed on the main body, the adjustable headrest assembly comprising:
at least one rail disposed on the main body;
a head support portion movably disposed on the at least one rail; and
a locking assembly for restraining or allowing movement of the head support portion relative to the main body, the locking assembly comprising a rack, a locking component and an operating component, the rack being disposed on the main body, the locking component being disposed on the head support portion for detachably engaging with the rack, the locking component engaging with the rack for restraining the movement of the head support portion relative to the main body, the locking component disengaging from the rack for allowing the movement of the head support portion relative to the main body, the operating component being movably disposed between the head support portion and the locking component and comprising an inclined structure for driving the locking component to disengage from the rack when the operating component is operated.

2. The child restraint system of claim 1, wherein the main body comprises a seat back portion and a seat portion, and the at least one rail extends along the seat back portion.

3. The child restraint system of claim 2, wherein the head support portion is slidably connected to the at least one rail.

4. The child restraint system of claim 1, wherein the at least one rail is fixedly disposed on the main body.

5. The child restraint system of claim 1, wherein the at least one rail is movably disposed on the main body and movable between a lower position and an upper position relative to the main body.

6. The child restraint system of claim 5, wherein the head support portion abuts against an upper portion of the at least one rail to drive the at least one rail to move to the upper position relative to the main body.

7. The child restraint system of claim 6, wherein the adjustable headrest assembly further comprises at least one recovering component for biasing the at least one rail to recover to the lower position relative to the main body.

8. The child restraint system of claim 5, wherein an upper portion of the at least one rail abuts against an upper portion of the main body when the at least one rail is located at the lower position, and the upper portion of the at least one rail departs away from the upper portion of the main body when the at least one rail is located at the upper position.

9. The child restraint system of claim 1, further comprising a harness at least partially disposed between the head support portion and the main body and abutted against by the head support portion, and a length of a part of the harness exposed out of the head support portion being adjustable by movement of the head support portion relative to the at least one rail.

10. An adjustable headrest assembly installed on a main body of a child restraint system, the adjustable headrest assembly comprising:
at least one rail disposed on the main body of the child restraint system;
a head support portion movably disposed on the at least one rail; and
a locking assembly for restraining or allowing movement of the head support portion relative to the main body, the locking assembly comprising a rack, a locking component and an operating component, the rack being disposed on the main body, the locking component being disposed on the head support portion for detachably engaging with the rack, the locking component engaging with the rack for restraining the movement of the head support portion relative to the main body, the locking component disengaging from the rack for allowing the movement of the head support portion relative to the main body, the operating component being movably disposed between the head support portion and the locking component and comprising an inclined structure for driving the locking component to disengage from the rack when the operating component is operated.

11. The adjustable headrest assembly of claim 10, wherein the at least one rail extends along a seat back portion of the main body of the child restraint system.

12. The adjustable headrest assembly of claim 11, wherein the head support portion is slidably connected to the at least one rail.

13. The adjustable headrest assembly of claim 10, wherein the at least one rail is fixedly disposed on the main body.

14. The adjustable headrest assembly of claim 10, wherein the at least one rail is movably disposed on the main body of the child restraint system and movable between a lower position and an upper position relative to the main body of the child restraint system.

15. The adjustable headrest assembly of claim 14, wherein the head support portion abuts against an upper portion of the at least one rail to drive the at least one rail to move to the upper position relative to the main body of the child restraint system.

16. The adjustable headrest assembly of claim 15, further comprising at least one recovering component for biasing the at least one rail to recover to the lower position relative to the main body of the child restraint system.

17. The adjustable headrest assembly of claim 14, wherein an upper portion of the at least one rail abuts against an upper portion of the main body of the child restraint system when the at least one rail is located at the lower position, and the upper portion of the at least one rail departs away from the upper portion of the main body of the child restraint system when the at least one rail is located at the upper position.

18. The adjustable headrest assembly of claim 10, wherein the head support portion abuts against a harness of the child restraint system, and a length of a part of the harness exposed out of the head support portion is adjustable by movement of the head support portion relative to the at least one rail.

* * * * *